United States Patent
Jones

(12) 
(10) Patent No.: US 6,704,171 B2
(45) Date of Patent: *Mar. 9, 2004

(54) APPARATUS AND SYSTEMS FOR LIFTING A TAPE DRIVE TRANSDUCER HEAD

(75) Inventor: William D. Jones, Wrentham, MA (US)

(73) Assignee: Quantum Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/563,105

(22) Filed: May 2, 2000

(65) Prior Publication Data

US 2003/0103297 A1 Jun. 5, 2003

(51) Int. Cl.⁷ .............................. G11B 5/55; G11B 21/02
(52) U.S. Cl. ....................................................... 360/317
(58) Field of Search ................................ 360/106, 109, 360/317

(56) References Cited

U.S. PATENT DOCUMENTS

| | | | | |
|---|---|---|---|---|
| 4,750,067 A | * | 6/1988 | Gerfast | 360/106 |
| 4,833,558 A | * | 5/1989 | Baheri | 360/106 |
| RE33,661 E | * | 8/1991 | Baheri | 360/106 |
| 5,198,947 A | * | 3/1993 | Nayak et al. | 360/291 |
| 5,379,170 A | * | 1/1995 | Schwarz | 360/291 |
| 5,434,732 A | * | 7/1995 | Schwarz et al. | 360/291 |
| 5,448,438 A | * | 9/1995 | Kasetty | 360/106 |
| 5,793,574 A | * | 8/1998 | Cranson et al. | 360/106 |
| 5,982,590 A | * | 11/1999 | Kinjo et al. | 360/109 |

* cited by examiner

Primary Examiner—George J. Letscher
Assistant Examiner—C R Beacham
(74) Attorney, Agent, or Firm—Morrison & Foerster LLP

(57) ABSTRACT

Apparatus, methods, and systems are described for lifting a read/write head in a digital tape system. Headlift systems according to the present invention include a guide pin that is an element of a stepper motor, a bracket coupled with the head, and a shaft-linking element. Such headlift systems provide reduced headlift error tolerances, and can therefore accurately place the head for reading and writing to smaller width data tracks on the tape. The bracket is configured to mate with the guide pin and to couple with a stepper motor rotational shaft. A motor according to the present invention includes a stepping motor, a shaft, and a guide pin. A bracket according to the invention includes a head mating surface, an arm, and typically includes a guide pin bushing. The arm includes a first opening aligned to receive the shaft, and a second opening aligned to receive the guide pin. The guide pin bushing is disposed in the second opening and is coupled with the guide pin to limit movement of the head radially and circumferentially relative to the shaft.

19 Claims, 6 Drawing Sheets

APPARATUS AND SYSTEMS FOR LIFTING A TAPE DRIVE TRANSDUCER HEAD

BACKGROUND OF THE INVENTION

1. Field of the Invention

The invention relates generally to the field of digital tape recording. More particularly, the invention relates to head lifting apparatus for digital tape systems.

2. Discussion of the Related Art

Headlift mechanisms are known to those skilled in the art. For example, a conventional headlift mechanism typically includes a headlift bracket coupled with a stepper motor (the combination herein referred to as the "headlift assembly"). The read/write transducer head of a data storage system is mounted on the bracket. The bracket is coupled with other portions of the tape drive via a head guide assembly (HGA) frame. The HGA includes the headlift assembly and the HGA frame. The stepper motor typically includes a threaded shaft that rotates to cause the head and the headlift bracket to move upwards or downwards across a digital tape. This movement positions the head over the tape's data tracks. Each data track runs along the length of the tape. Multiple data tracks are disposed vertically, one above the other, over the width of the tape. One of the key capacity limitations of tape storage systems has been that only a limited number of data tracks could be placed over the width of the tape because of the headlift assembly could not accurately place the head over the tracks.

FIG. 1 shows a portion of a tape drive including a conventional HGA 100. The conventional HGA includes conventional stepper motor 110, HGA frame 120, and headlift bracket 130. HGA guide pin 140 is mounted on HGA frame 120 to provide head alignment accuracy across the width of the tape.

Conventional stepper motor 110 includes a rotating shaft, which is typically a lead-screw 112 and a circular top surface 114. Lead-screw 112 extends upwards from circular top surface 114.

Headlift bracket 130 includes a platform 132 for mating with the head, and a conventional arm (not shown in FIG. 1) extending horizontally from the platform. The conventional arm typically has an opening and a nut configured to receive lead-screw 112, which when fastened to the lead-screw cause the HGA to move upwards or downwards in response to movement of the lead-screw. Neither the nut nor the opening is shown in FIG. 1. Conventional stepper motor 110 controls movement of lead-screw 112. Any rotation about the threads of lead-screw 112 results in movement of the headlift assembly upward or downward along the screw.

HGA guide pin 140 is mated to headlift bracket 130 using a claw 150 disposed on the bracket. Claw 150 is attached to HGA frame 120. Claw 150 engages HGA guide pin 140 and attaches HGA guide pin 140 to HGA frame 120.

Headlift bracket 130 is adjusted so that the lifting surface 160 (the mounting surface for the transducing head) is parallel to HGA frame 120's mounting surface plane. As shown in FIG. 1A, the mounting surface plane is defined at points 165. These three mounting surfaces of the HGA are known collectively as "Datum A." The adjustment of the lifting surface 160 relative to the mounting surface is called "adjusting azimuth and zenith."

Returning to FIG. 1, once the azimuth and zenith adjustment is complete, claw 150 will generally not be parallel with HGA guide pin 140. To overcome a potential binding of claw 150 with HGA guide pin 140 a loosely fitting claw bushing 152 is installed between the claw and the pin. In some conventional HGA designs, claw 150 includes a claw pin 154 extending upwards from the rest of the claw. Claw bushing 152 can snap onto claw pin 154. Claw bushing 152 is allowed to pivot about claw pin 154 (i.e., rotate about claw 150) to relieve the binding of the claw and HGA guide pin 140.

As headlift bracket 130 moves up and down along its designated length of travel, the relationship between claw 150 and HGA guide pin 140 changes. The relationship changes because of the loose fit between HGA guide pin 140 and claw 150 at the height of claw bushing 152 that potentially results in a non-parallel condition between claw 150 and HGA guide pin 140. When claw 150 is not parallel with HGA guide pin 140, a first side of claw 150 can rub HGA guide pin 140 at the bottom of the headlift travel; while the opposite side of the claw can rub HGA guide pin 140 at the top end of the headlift travel. The change in contact from one side of claw 150 to the other side can cause headlift bracket 130 to rotate while lifting. Such rotation causes an undesired linear movement of the head.

Conventional headlift mechanisms typically have large lift error tolerances that can range up to approximately 450 micro-inches. However, because newer tape drives have more and narrower data tracks, as well as higher tape speeds to meet demands for increased storage, tighter headlift tolerances have been imposed. As a result, the first pass yields and final yields for building conventional HGA have become unacceptably low.

The low manufacturing yields for headlift assemblies applying the prior art approach to high speed and high storage density tape drive systems result in much higher cost. The low manufacturing yields are caused by tolerance problems arising from the non-parallel condition of claw 150 and HGA guide pin 140. If the alignment errors for the HGA components are too large, then HGA guide pin 140 and claw 150 are subject to a binding condition during movement of the HGA components during azimuth and zenith alignment. Therefore, what is also needed is a solution that meets the above-discussed headlift accuracy requirements in a more cost-effective manner. An HGA assembly that can position the head more precisely as required by new high data capacity, high-speed tape drive systems, and still be manufactured with acceptable yields is needed

SUMMARY OF THE INVENTION

A headlift system according to the present invention includes a guide pin that is integrated with a stepper motor having a shaft, and a bracket coupled to a magnetic tape transducer head. The bracket is configured to couple with the guide pin and the stepper motor shaft to provide more accurate movement of the head than conventional headlift systems.

The stepping motor controls the rotational movement of the shaft. The shaft extends from the stepping motor along a first axis and rotates about this axis. The guide pin extends from the stepping motor in approximately the same direction as the first axis. The guide pin is spaced apart from the shaft.

The head lift system also includes a bracket. The bracket includes a head mating surface, an arm, and a bushing. The arm extends horizontally from the head-mating surface. The arm includes a first opening aligned to receive the shaft, and a second opening aligned to receive the guide pin. The bushing is disposed in the second opening. The bushing is coupled with the guide pin to limit movement of the head radially, and to limit movement of the head circumferentially relative to the shaft.

The head lift system also includes a shaft-linking element. The shaft-linking element is positioned and dimensioned for coupling with the shaft.

These and other aspects of the invention will be better appreciated and understood when considered in conjunction with the following description and the accompanying drawings.

BRIEF DESCRIPTION OF THE DRAWINGS

Embodiments of the present invention are illustrated in the drawings accompanying and forming a part of this specification, wherein like reference characters (if they occur in more than one view) designate the same parts. It should be noted that the features illustrated in the drawings are not necessarily drawn to scale.

DESCRIPTION OF PREFERRED EMBODIMENTS

The entire contents of U.S. Pat. No. 5,448,438 entitled "Head Actuator Having a Spring Loaded Split Nut", and U.S. Pat. No. 5,793,574 entitled "Tape Head Actuator Assembly Having a Shock Suppression Sleeve" are hereby expressly incorporated by reference into the present application as if fully set forth herein.

The embodiments of the present invention described herein provide a headlift system that meets the need for more accurate linear movement of a tape transducer head. The headlift system moves the tape head and positions the tape head over different tracks of data on magnetic tape. The tracks run approximately lengthwise in the travel direction of the tape, and each tape may have many tracks. The data tracks are typically approximately parallel to each other on the tape.

Stepper Motor

Figure 2:
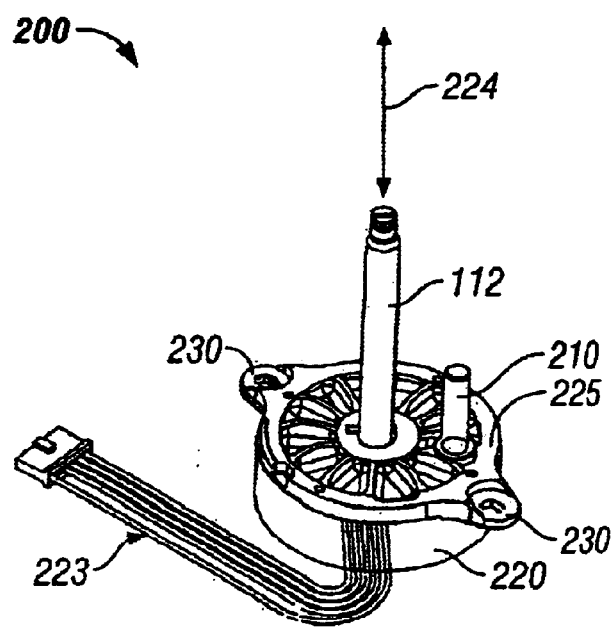
FIG. 2 is a perspective view of a modular headlift stepper motor used in the present invention.

A first aspect of the invention provides a stepper motor, shown in FIG. 2, for lifting a head using a modular headlift assembly. Modular headlift (MH) stepper motor 200 includes a stepping motor, a shaft, and MH guide pin 210. The shaft is typically a lead-screw 112. The stepping motor is enclosed in motor casing 220. Wires 223 connect stepper motor 200 to a stepper motor controller (not shown).

MH stepper motor 200 supplies the modular headlift assembly with extremely accurate rotational stepping. Lead-screw 112 is a somewhat long and very accurate screw that provides a means for conversion of the lead-screw rotational movement into linear movement of an MH bracket.

Lead-screw 112 rotates about first axis 224. First axis 224 is approximately perpendicular to tape movement direction 308. The direction of first axis 224 corresponds to movement of the transducer head across the width of the tape. MH guide pin 210 extends from motor casing 220 in approximately the direction of first axis 224. MH guide pin 210 is spaced apart from lead-screw 112.

In some embodiments, motor casing 220 has a circular top surface. The circular top surface can be attached, as an MH faceplate 225, to the rest of motor casing 220. MH faceplate 225 can comprise a frame with at least one open area. Faceplates manufactured by Altum Precision (located in Singapore) and Shinano Kenshi Corp. (SKC—located in Nagano-Ken, Japan) can be used for the MH faceplate 225.

MH faceplate 225 can have an orientation according to a faceplate plane. The plane of MH faceplate 225 is typically approximately perpendicular to the direction of first axis 224. In some embodiments, lead-screw 112 is centrally disposed on MH faceplate 225 and extends upwardly from MH faceplate 225.

In the preferred embodiment, MH guide pin 210 is very straight and extends approximately in the direction of first axis 224. While the straightness of MH guide pin 210 is subject to some tolerance variability, the straightness tolerance should be no more than 0.001 inch. Similarly, lead-screw 112 straightness tolerance should be no more than 0.001 inch. A commercially available stepper motor assembly from Shinano Kenshi Corporation, part number 12-60323-01, provides such lead-screw 112 and MH guide pin 210 straightness and can be used for the present invention.

Because MH guide pin 210 is an element of MH stepper motor 200, assessment of the straightness and orientation tolerances of MH guide pin 210 can be done before mating MH stepper motor 200 to an MH bracket. This single-element assessment of MH guide pin 210 tolerances is accomplished using an attachment element disposed on MH faceplate 225. MH faceplate has at least one attachment element for attaching MH stepper motor 200 to other elements of a modular headlift assembly. MH stepper motor 200 includes two mounting ears 230 disposed at opposite ends of the outer diameter of MH faceplate 225. Mounting ears 230 function as attachment elements for the preferred embodiment. Other arrangements of attachment elements can be used, so long as they provide sufficient rigidity when MH stepper motor 200 is attached to the other modular headlift assembly components.

Mounting ears 230 include flanges extending outwardly from the motor casing 220. The top surface of at least one mounting ear 230 flange can be used to measure the perpendicularity of MH guide pin 210. The measurement of the perpendicularity tolerance of MH guide pin 210 is performed on MH stepper motor 200 before MH stepper motor 200 is used in the MH.

MH guide pin 210 can be mounted onto MH faceplate 225. In a preferred embodiment, MH guide pin 210 is press fit into a bore in MH faceplate 225. The press fit of MH guide pin 210 is self-aligning with the bore. If the bore is machined correctly and is perpendicular to the mounting surface, MH guide pin 210 will also be positioned correctly relative to the mounting surface. The perpendicularity of the bore is accomplished using computer controlled machining techniques. The self-alignment feature of the press fit of MH guide pin 210 reduces assembly time and the amount of assembly tooling needed.

For MH guide pins 210 that fit more loosely in the bore, a fixture is required to assemble MH guide pin 210, and an alternative means of holding MH guide pin 210 to MH faceplate 225 is also required. In some embodiments, the fit of MH guide pin 210 within MH faceplate 225 bore is in a range from approximately 0.0001 inch to approximately 0.001 inch, or nominally 0.0003 inch. The close and self-aligning fit of MH guide pin 210 and MH faceplate 225 bore controls the perpendicularity tolerances for MH guide pin 210 and lead-screw 112. Retaining a small perpendicularity error ensures that the headlift bracket 300 shown in FIG. 3 will lift the transducer head with little or no angular movement.

Alternative methods for attaching MH guide pin 210 on MH faceplate 225 include gluing, swaging, riveting, or screwing the guide pin. These methods may not be as accurate or cost-effective as the press fit attachment method.

In a preferred embodiment, lead-screw 112 has a pitch of approximately 20 threads per inch. But, the number of threads per inch for lead-screw 112 can range from approximately ten threads per inch to approximately eighty threads per inch. In a preferred embodiment, one step of the stepping motor rotates lead-screw 112 approximately 1.8 degrees. But, the step can range from 0.5 degrees to approximately 5 degrees. Also, in a preferred embodiment, a single step of the stepping motor is converted into a linear movement of approximately 0.000125-inch of lead-screw 112. But, in other embodiments the single step can be converted into a linear movement of lead-screw 112 ranging from approximately 0.000050 inch to approximately 0.0005 inch.

The diameter of lead-screw 112 is typically in a range from approximately 0.125-inch to approximately 0.5 inch. The length of lead-screw 112 can be in a range from approximately 0.1 inch to approximately 10 inches, and for some embodiments is approximately 2 inches.

Note that the single-element assessment of MH guide pin 210 dimensional and orientation tolerances provided by the present invention enables inexpensive early detection of nonconforming MH guide pins 210 and MH stepper motors 200. In contrast, perpendicularity and dimensional conformance of conventional HGA guide pin 140 (see FIG. 1) cannot be properly evaluated until stepper motor 110 is assembled to HGA frame 120 and headlift bracket 130.

Headlift Bracket

Figure 3:
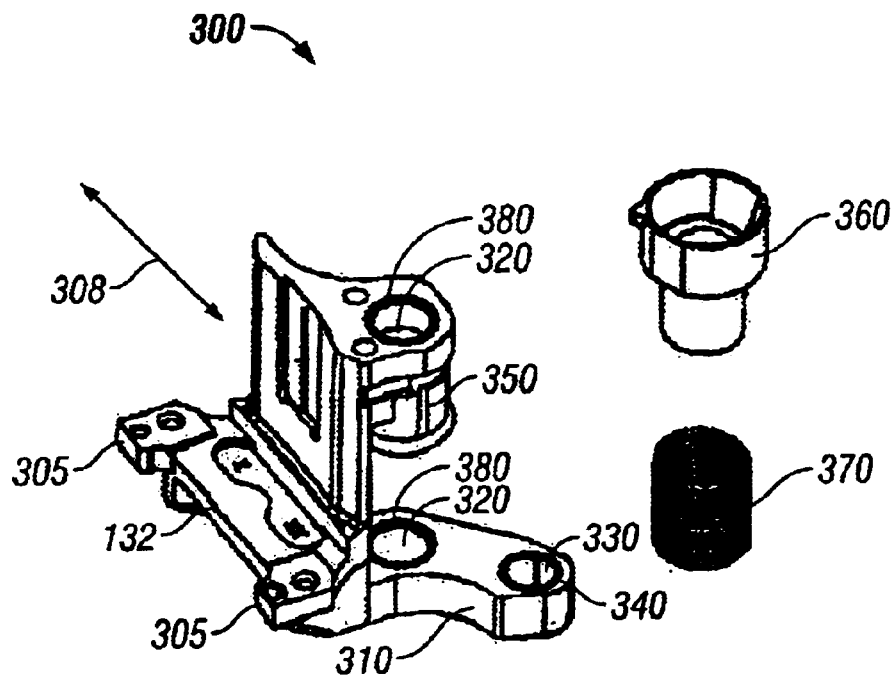
FIG. 3 is a perspective view of a modular headlift bracket used in the present invention.
Figure 4:
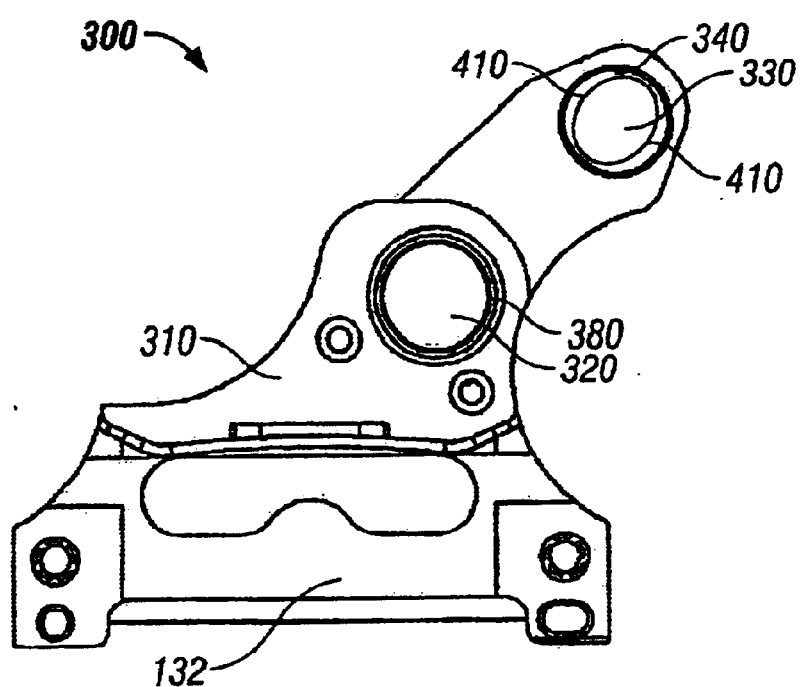
FIG. 4 is a top view of the modular headlift bracket shown in FIG. 3.

MH bracket 300 is shown in FIG. 3 and FIG. 4. At least one transducer head is disposed on MH bracket 300 at head placement location 305. The tape moves across the head(s) in tape movement direction 308. Tape movement direction 308 and the direction of the width of the tape define a tape plane. MH bracket 300 includes platform 132 and MH arm 310. Platform 132 is configured for mating with a head for writing and reading data on a magnetic tape. Platform 132 includes a first surface extending essentially in the plane formed by the tape as it passes the head. Platform 132 also typically includes a second surface that is approximately perpendicular to the first surface, perpendicular to the tape width, and extends in a first direction away from the head. Head placement locations 305 are disposed on the second surface, which is an integral element of platform 132. Note that the second surface is maintained parallel to Datum A on MH HGA frame 510 (see FIG. 5) during the azimuth and zenith adjustment, so that the plane of the first surface is parallel to tape movement direction 308. Head placement locations 305 are typically machined, while the rest of platform 132 is typically left as cast.

MH arm 310 extends from platform 132 in a second direction away from the head and opposite to the direction away from the head of the second surface of platform 132. MH arm 310 has a proximal opening 320 and a distal opening 330. Proximal opening 320 is aligned to receive lead-screw 112. Distal opening 330 is aligned to receive MH guide pin 210. Guide pin bushing 340 is disposed within distal opening 330.

A shaft-linking element (such as split nut 350) is disposed above proximal opening 320. The shaft-linking element is positioned and dimensioned for engaging lead-screw 112 and for converting radial movement of lead-screw 112 into linear movement that lifts and lowers the transducer head. In a preferred embodiment, the shaft-linking element is split nut 350. As shown in FIG. 3, split nut 350 is an element of MH bracket 300. For other embodiments, the shaft-linking element need not be an element of MH bracket 300.

In some embodiments, a circular spring (not shown) fits around split nut 350 to remove backlash between split nut 350 and lead-screw 112. Some embodiments of split nut 350 are described in U.S. Pat. No. 5,448,438.

In some embodiments, shock sleeve 360 along with shock sleeve spring 370 are disposed between split nut 350 and MH arm 310 to limit the linear movement of the modular headlift assembly during a severe shock of the drive. If the drive receives a shock force along lead-screw 112, there is a potential that the force could cause split nut 350 to open and slip a thread on lead-screw 112. Shock sleeve 360 is designed to limit opening of split nut 350 so that the nut cannot open wide enough to slip a thread. Some embodiments of the shock sleeve are described in U.S. Pat. No. 5,793,574. For embodiments that do not include shock sleeve 360 the vertical gap separating the shaft-linking element from proximal opening 320 can be very small, e.g., less than 0.01 inch.

MH bracket 300 has three bushings that are press fit therein and then machined. Guide pin bushing 340 is shaped (typically as a slot) to provide circumferential (anti-rotation) guiding of the modular headlift assembly. Two lead-screw bushings 380 are shaped to supply linear guiding of the modular headlift assembly along lead-screw 112.

Guide pin bushing 340 provides proper positioning for the headlift assembly, by limiting radial and circumferential movement of guide pin 210 relative to lead-screw 112. Guide pin 210 thereby limits radial and circumferential movement of the other modular headlift assembly components relative to lead-screw 112. In some embodiments, guide pin bushing 340 has an oval inner diameter. For these embodiments, only the two sides of guide pin bushing 340 having the smaller inner diameter normally touch MH guide pin 210. These two bushing sides 410 are shown in FIG. 4.

Still referring to FIG. 4, two guide pin bushing 340 ends are disposed opposite each other and approximately perpendicular to bushing sides 410. The inner diameter formed by the guide pin bushing 340 ends is larger than the diameter formed by bushing sides 410. The guide pin bushing 340 ends combine with their corresponding bushing sides 410 to form "slots". The slots allow MH guide pin 210 and lead-screw 112 to tilt toward or away from each other by as much as approximately 0.010 inch as the head is lifted up and down across the width of the tape. This limited amount of movement of the MH guide pin 210 is needed because even though perpendicularity of MH guide pin 210 is manufactured to relatively tighter tolerances compared to the prior art, some perpendicularity tolerance still exists.

The positions of MH guide pin 210 and guide pin bushing 340 along with the dimensions of their coupling surfaces provide a loose fit ranging from approximately 0.0003 inch to approximately 0.006 inch clearance between MH guide pin 210 and bushing sides 410. A somewhat loose fit is preferred to allow for thermal expansion of dissimilar materials and to prevent binding. However, too loose a fit reduces lifting accuracy because the headlift can rotate about lead-screw 112 causing linear headlift errors.

Another consideration in determining the size of the inner diameter(s) (bushing side 410 and end diameters for oval-shaped bushings) of guide pin bushing 340 is that for high volume machining, a larger diameter-milling bit is more stable than a smaller bit. The larger diameter bit remains "true" while cutting through guide pin bushing 340 to create the oval shape of the inner diameter. A smaller diameter bit can "deflect" during cutting causing the perpendicularity of guide pin bushing 340 relative to MH arm 310 to change as more material is removed.

In an alternative embodiment, guide pin bushing 340 can be spring-loaded so that guide pin bushing 340 always rides on one particular side of MH guide pin 210. This embodiment improves the lift error and can reduce manufacturing costs. The benefits arise because a tighter fit between guide pin bushing 340 and MH guide pin 210 is provided. The tighter fit improves accuracy. But, the drawback to a spring-loaded guide pin bushing is increased friction. For these embodiments, MH stepper motor 200 needs additional torque to lift the assembly under the higher friction provided by the spring-loaded guide pin bushing 340; otherwise a binding condition will arise.

Lead-screw bushings 380 hold MH bracket 300 perpendicular to lead-screw 112 and act as bearing surfaces between lead-screw 112 and MH bracket 300. Lead-screw bushings 380 guide lead-screw 112 along first axis 224 as lead-screw 112 lifts the head. Similar to MH guide pin 210, lead-screw 112 has some perpendicularity tolerance, and movement accommodating this tolerance is provided within the inner diameter of the lead-screw bushing(s) 380. In some embodiments, only one lead-screw bushing 380 is disposed on MH arm 310 instead of the two lead-screw bushings 380 described above.

Headlift System

Figure 5:
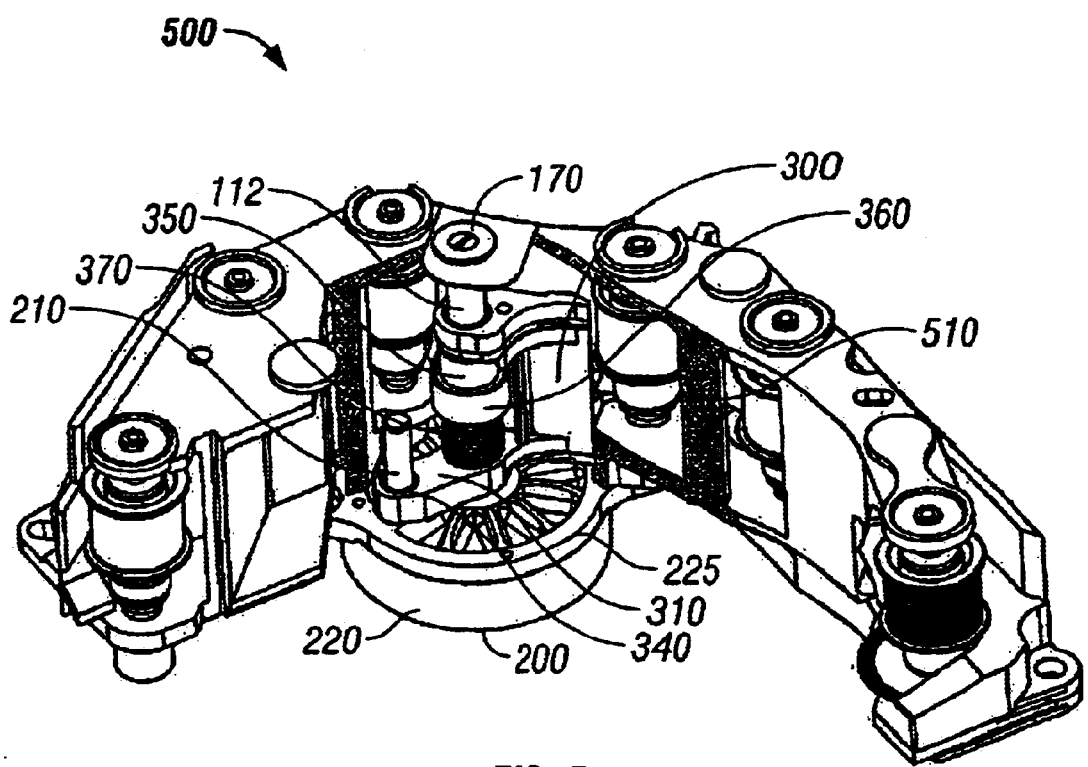
FIG. 5 is a perspective view of the back of a portion of a tape drive including a modular head guide assembly used in the present invention.
Figure 5A:
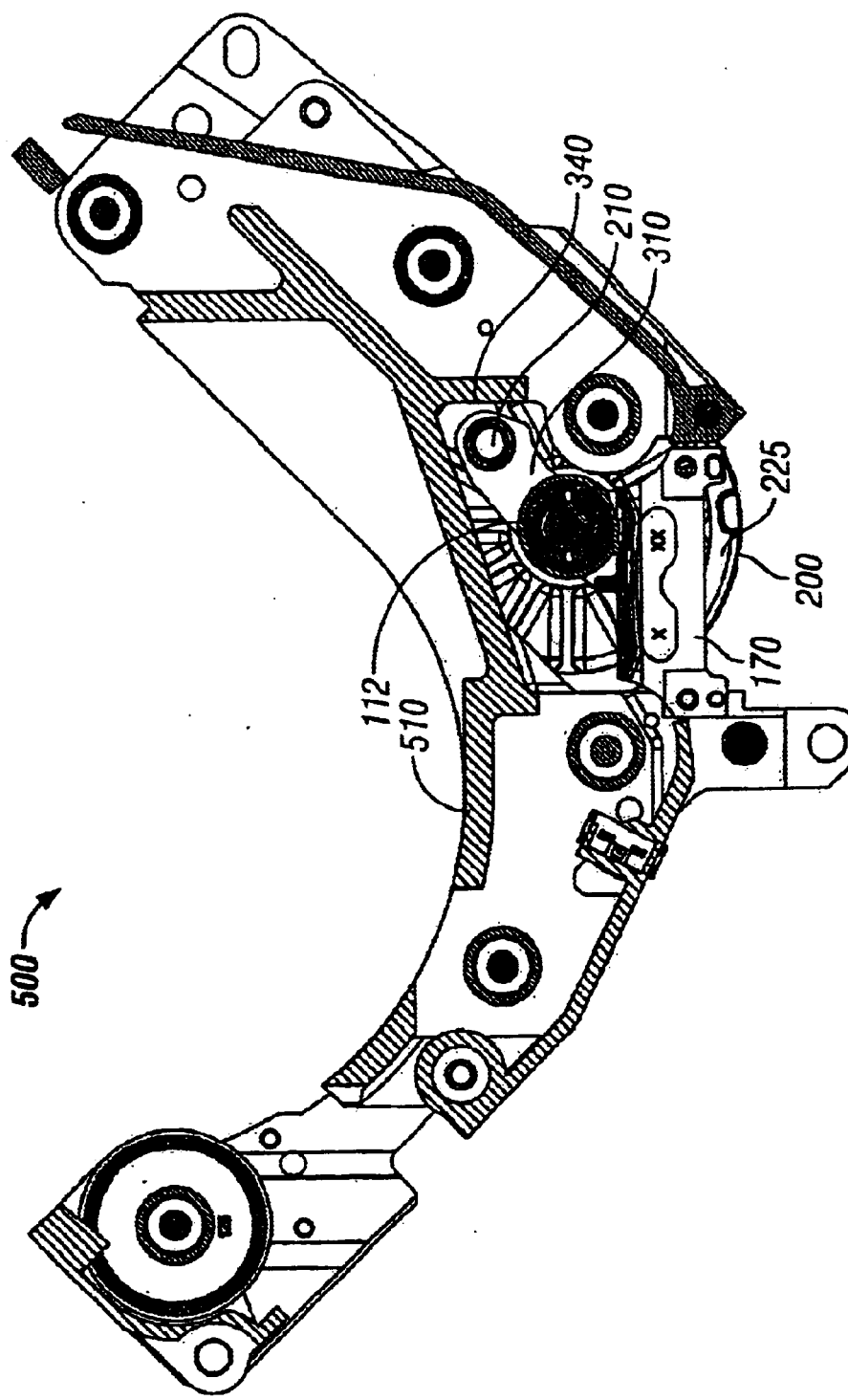
FIG. 5A is a top view of a portion of the tape drive shown in FIG. 5.
Figure 6:
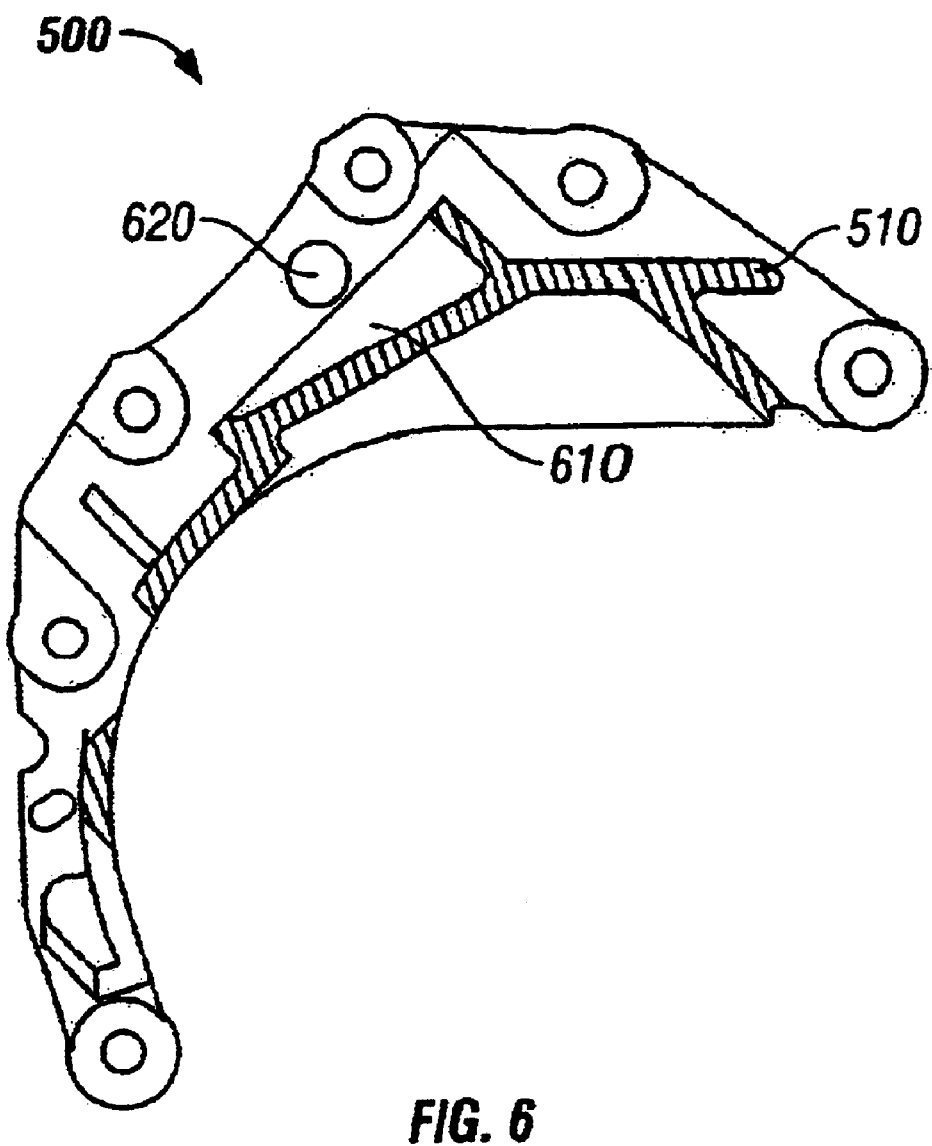
FIG. 6 is a bottom view with a partial cross section of the portion of the tape drive shown in FIG. 5.

As shown in FIG. 5, FIG. 5A, and FIG. 6, the headlift system of the present invention includes MH stepper motor 200 coupled with MH bracket 300. The modular headlift system is typically placed in a modular headlift head guide assembly (MH HGA) by combining MH stepper motor 200 and MH bracket 300 with MH HGA frame 510.

Portions of some embodiments of the MH HGA including MH stepper motor 200 and MH bracket 300 are shown as part of a tape drive in FIG. 5 and FIG. 5A. FIG. 5 is a perspective view of the back of a portion of a tape drive including the MH HGA. This portion is hereinafter referred to as MH tape drive portion 500, and is shown in FIG. 5 with a portion of MH HGA frame 510 removed to provide a better view of the headlift system. FIG. 5A is a cross-sectional view of MH tape drive portion 500 that shows the portions of MH HGA frame 510 that were removed in FIG. 5.

MH tape drive portion 500 includes an MH HGA. Some embodiments of the MH HGA do not include all of the features of MH HGA frame 510. But, head lifting systems according to the present invention typically include means for coupling MH stepper motor 200 and MH bracket 300 with reference surfaces such as the mounting surface shown in FIG. 1A.

Figure 1:
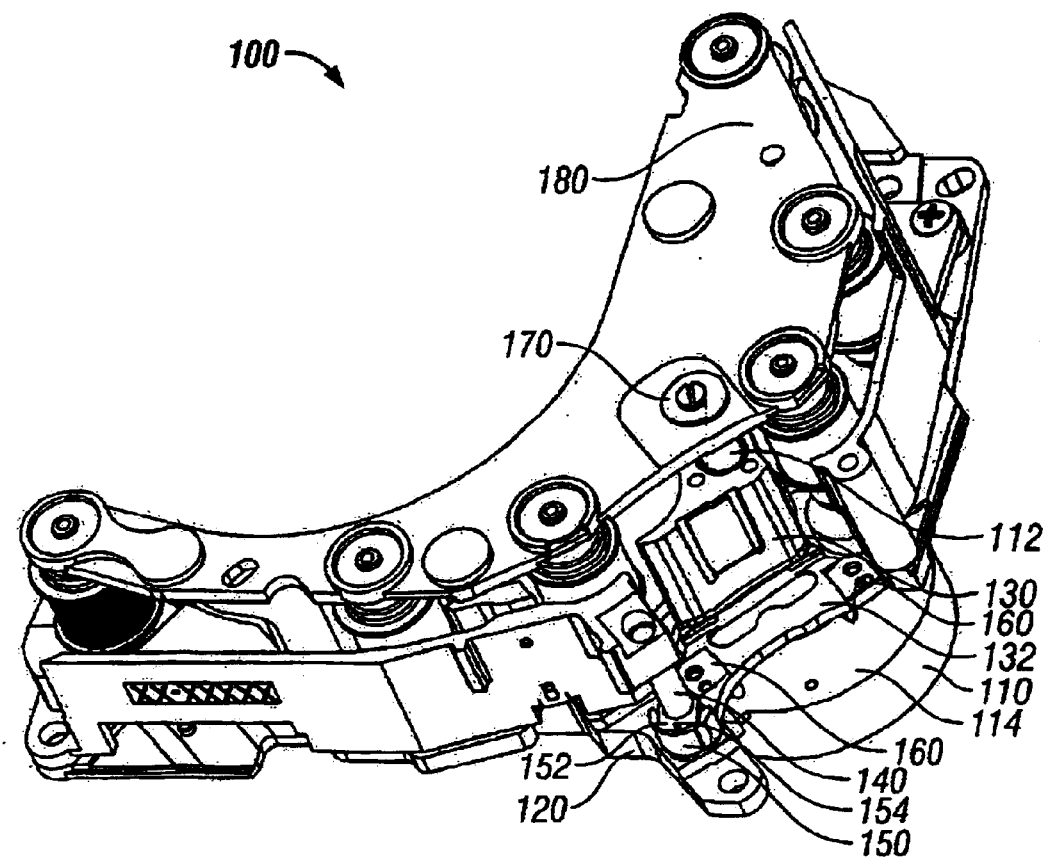
FIG. 1 is a perspective view of a portion of a known tape drive including a conventional HGA, appropriately labeled "PRIOR ART".
Figure 1A:
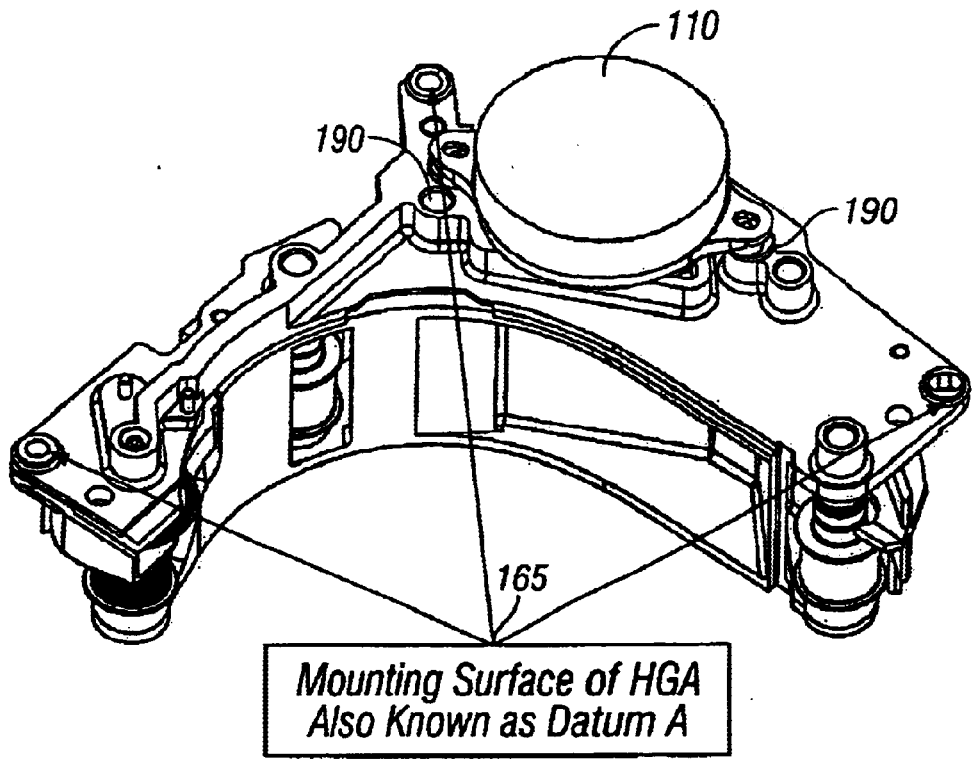
FIG. 1A is a perspective view of the bottom of the known tape drive shown in FIG. 1.

MH stepper motor 200 couples to MH bracket 300 by the threadable mating of lead-screw 112 with split nut 350 and the coupling of lead screw 112 with lead-screw bushings 380 (shown in FIG. 3). MH stepper motor 200 and MH bracket 300 couple by the contact of MH guide pin 210 with guide pin bushing 340. MH HGA frame 510 couples to MH stepper motor 200 by the coupling of lead-screw 112 with through hole 620, which is shown in FIG. 6. The top of lead-screw 112 can engage top bearing 170. Top bearing 170 is disposed on tape drive portion top 180 as shown in FIG. 1. Mounting ears 230 for MH stepper motor 200 can be secured to MH HGA frame 510 at corresponding frame attachment features, such as stepper attach points 190 shown in FIG. 1A.

The MH HGA moves the read/write head upward and downward along the width of the tape by accurately converting rotational movement (e.g., turns of lead-screw 112) into linear movement of the head. The MH HGA provides improved head lifting accuracy because of the close fit of MH guide pin 210 and guide pin bushing 340. The close fit constrains the movement of MH bracket 300, and thereby the head, in the circumferential direction and the radial direction. The circumferential movement equates to linear error. MH guide pin 210 and guide pin bushing 340 stop MH bracket 300 from moving in a circumferential direction and thereby prevent the bracket from spinning around on lead-screw 112. Some embodiments of the MH HGA are designed to function in a ½ step mode, and provide a maximum linear peak to peak error of less than approximately 0.000220 inch over approximately a 0.250 inch range.

The head movement can be programmed to correspond to different data tracks, where each data track runs along the length of the tape. More accurate head lifting enables the use of smaller track widths. When the track widths are smaller, more tracks can be stacked on the same width of tape, thereby increasing the storage capacity of the tape drive. Accurate lifting also results in a lower error rate of the data being recorded and retrieved, as the head is more accurately positioned over the selected track. The lower error rate provides higher performance for the drive in terms of data reading and writing rates and data storage capacities.

As shown in FIG. 4, the inner diameter of guide pin bushing 340 can be machined to tight tolerances. These tight tolerances enable maintenance of a close positional and dimensional relationship between guide pin bushing 340 and MH guide pin 210. If MH guide pin 210 is too loose to guide pin bushing 340, the linear lifting error of the modular headlift assembly increases because rotation of MH bracket 300 is not sufficiently constrained. If MH guide pin 210 is too tight to guide pin bushing 340, line to line, the error becomes very small but the lifting mechanism is more likely to bind due to excessive friction between guide pin 210 and the guide pin bushing 340. The binding can result in MH stepper motor 200 failing to lift the head. Therefore, a tightly controlled relationship between MH guide pin 210 and the guide pin bushing 340 enables the modular headlift assembly to provide superior performance.

Alignment of MH guide pin 210 is relative to lead-screw 112 and mounting ears 230. For embodiments represented by FIG. 5, lead-screw 112 is assembled to MH stepper motor 200 using a lower set of ball bearings. The lower set of bearings can act like a spring, and allow for lead-screw 112 to move out of alignment, e.g. relative to first axis 224. Because of the lead-screw 112 alignment tolerance, when lead-screw 112 rotates a small amount of run out error (e.g., wobble) is added to the headlift system. Top bearing 170 helps control this out of axis movement of lead-screw 112.

Pitch errors can also arise because of dissimilarities between the lower set of bearings and top bearing 170. Because of the pitch errors and the run out error, the perpendicularity of MH guide pin 210 is typically measured relative to the flat portion of the top surface of mounting ears 230 on MH faceplate 225.

The perpendicularity of MH guide pin 210 is controlled to tight tolerances to assure that the positional relationship between guide pin bushing 340 and MH guide pin 210 is maintained. In a preferred embodiment, the perpendicularity tolerance of MH guide pin 210 relative to the top surface of mounting ears 230 is less than approximately 0.001 inch, but the perpendicularity tolerance can be in a range from approximately 0.0001 inch to approximately 0.01 inch.

For embodiments where guide pin bushing 340 forms a slot, the perpendicularity tolerance in line with lead-screw 112 can exceed 0.010 inch without affecting the function of the HGA. But, for a preferred embodiment, the perpendicularity of MH guide pin 210 at approximately ninety degrees from the inline direction is controlled to less than 0.001 inch to assure that no binding occurs.

As shown in FIG. 5, MH guide pin 210 is coupled with MH bracket 300 on the back right hand section of the bracket. Such placement of MH guide pin 210 allows maximum clearance between MH bracket 300 and MH HGA frame 510 before azimuth and zenith adjustments. For some embodiments, the clearance between MH bracket 300 and MH HGA frame 510 before zenith and azimuth adjustments is in a range from approximately 0.02 inch to approximately 0.10 inch. If the clearance is not sufficient to accommodate the zenith and azimuth adjustments, then the HGA cannot be used.

The angular (circumferential) movement of MH bracket 300 for a given looseness of MH guide pin 210 to guide pin bushing 340 fit decreases as the distance between lead-screw 112 and the guide pin increases. The fit between guide pin bushing 340 and MH guide pin 210 therefore becomes less critical as the guide pin is disposed farther away from lead-screw 112. In some embodiments, MH guide pin 210 can be located as far away as possible from lead-screw 112 without causing MH bracket 300 to contact MH HGA frame 510 after the azimuth and zenith adjustment. Such placement of MH guide pin 210 takes advantage of the decreased sensitivity to the MH guide pin 210 to guide pin bushing 340 fit with increased guide pin to lead-screw 112 separation. The separation distance between MH guide pin 210 and lead-screw 112 typically ranges from approximately 0.1 inch to approximately 1.0 inch.

The size of the diameter of MH guide pin 210 is based on a number of considerations. For some embodiments of the invention, MH guide pin 210 diameter is in a range from approximately 0.05 inch to 0.3 inch. For excessively large diameter MH guide pins 210, a correspondingly large guide pin bushing 340 requires a larger MH arm 310. The larger MH arm 310 reduces the clearance between MH arm 310 and MH HGA Frame 510. The reduction of clearance can result in interference between the modular headlift assembly and MH HGA Frame 510.

To avoid this interference, MH guide pin 210 and MH arm 310 are disposed within a triangular placement area 610, as shown in FIG. 6. FIG. 6 also shows through hole 620 of MH HGA frame 510 positioned and dimensioned for receiving lead-screw 112.

Excessively small diameters for MH guide pin 210 cause difficulties with MH guide pin 210 mating with guide pin bushing 340. Small diameter MH guide pins 210 can also cause misalignment of MH guide pin 210 to MH faceplate 225 bore because the smaller diameter MH guide pins 210 can reshape the bore by "plowing" into the bore.

When compared to the conventional headlift systems, guide pin bushing 340 replaces claw 150, claw bushing 152, and claw pin 154. Because MH guide pin 210 is coupled with guide pin bushing 340 to provide close to zero radial movement, the lifting error for the head is greatly reduced for the modular headlift assembly compared to the conventional headlift system. Because of the close positional and dimensional relationship of MH guide pin 210 and guide pin bushing 340, the azimuth and zenith adjustment has a far smaller effect on the headlift accuracy for the MH HGA compared to the conventional headlift using claw 150. ps Method for Assembling a Headlift System Another aspect of the invention includes a method for assembling a headlift system. The method includes providing a bracket attached to the head, and providing a motor for lifting the head.

The bracket includes a first opening (e.g., proximal opening 320) and a second opening (e.g. distal opening 330). Distal opening 330 is coupled with guide pin bushing 340. Distal opening 330 is spaced apart from proximal opening 320. Guide pin bushing 340 has an inner edge. The motor includes a stepping motor, lead-screw 112, and MH guide pin 210. The sequence of the motor providing step and the bracket-providing step can be reversed.

The method continues after the motor providing step by placing MH guide pin 210 through distal opening 330 and through guide pin bushing 340, and then placing lead-screw 112 through proximal opening 320. MH guide pin 210 and guide pin bushing 340 form a fit with a gap between at least one edge of MH guide pin 210 and the inner diameter of guide pin bushing 340. The sequence of the guide pin placement step and the shaft-placement step can be reversed.

In some embodiments, the method for assembling a headlift system includes coupling lead-screw 112 with a nut, and enclosing the stepping motor in motor casing 220. The method continues by attaching at least one casing attachment element (e.g., a mounting ear 230) to at least one corresponding stepper attach point 190 to couple the stepping motor to MH HGA frame 510. The nut is disposed above proximal opening 320. Mounting ear 230 is disposed on motor casing 220. Stepper attach point 190 is disposed on MH HGA frame 510. For a preferred embodiment, the coupling of lead-screw 112 with the nut, the enclosing the stepping motor, and the attachment of the casing attachment element to stepper attach point 190 are performed to provide a clearance between MH bracket 300 and MH HGA frame 510 in a range from approximately 0.02 inch to approximately 0.10 inch before azimuth and zenith adjustment.

Advantages of the Invention

Modular headlift (MH) stepper motors 200, MH brackets 300, modular headlift systems, and head lifting methods representing embodiments of the invention, can be cost effective and advantageous for at least the following reasons. The invention provides improved headlift accuracy for high capacity tape drive systems requiring narrow tape track widths. The invention also enables key dimensional features of the headlift system to be evaluated on a component basis, before MH stepper motor 200 is placed into the modular headlift system.

Because of the use of MH guide pin 210 and guide pin bushing 340, the azimuth and zenith adjustment has a far smaller effect on the headlift accuracy for the MH head guide assembly (HGA) compared to the conventional headlift using claw 150. While errors in lifting are almost always encountered during the assembly and testing of conventional headlift mechanisms, almost all of these errors can now be detected at the component testing level using the MH HGA. Therefore, the comparatively large lift error tolerances needed to ensure reasonable assembly yields for conventional headlift mechanisms can be dramatically reduced for the MH HGA. Such reductions are needed to meet the increasing demand for data storage capacity by having narrower data tracks. For example, conventional headlift mechanisms for these newer narrow data track systems can suffer from first pass yields of less than 60%, and final yields for acceptable HGA/Headlift assemblies of around 70%. In contrast, a typical build of 95 modular headlift assembly units has a first pass yield greater than 95% and a final yield for lifting accuracy approaching 100%. The headlift accuracy improvement provided by the MH HGA has been established by increased yields (e.g., of approximately 95%) for HGAs according to the invention when tested for a 0.000220 inch maximum linear peak to peak error requirement over approximately a 0.25 inch range.

It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended claims.

Q00-1023 Reference Characters "Apparatus, Systems, and Methods for Headlift"

| Ref. # | Description of Item | Figures |
|---|---|---|
| 100 | Portion of a tape drive with a conventional HGA | 1 |
| 110 | Conventional stepper motor | |
| 112 | Lead-screw | |
| 114 | Circular top surface | |
| 120 | HGA frame | |
| 130 | Headlift bracket | |
| 132 | Platform | |
| 140 | HGA Guide pin | |
| 150 | Claw | |
| 152 | Claw bushing | |
| 154 | Claw pin | |
| 160 | Lifting Surface | |
| 165 | Points | |
| 170 | Top bearing | |
| 180 | Tape drive portion top | |
| 190 | Stepper attach point | |
| 200 | MH stepper motor | |
| 210 | MH guide pin | |
| 220 | Motor casing | |
| 223 | Wires | |
| 224 | First axis | |
| 225 | MH faceplate | |
| 230 | Mounting ear | |
| 300 | MH bracket | |
| 305 | Head placement location | |
| 308 | Tape movement direction | |
| 310 | MH arm | |
| 320 | Proximal opening | |
| 330 | Distal opening | |
| 340 | Guide pin bushing | |
| 350 | Split Nut | |
| 360 | Shock sleeve | |
| 370 | Shock sleeve spring | |
| 380 | Lead-screw bushing | |
| 410 | Bushing side | |
| 500 | MH Tape Drive Portion | |
| 510 | MH HGA Frame | |
| 610 | Placement area | |
| 620 | Through hole | |

What is claimed is:

1. A system for lifting at least one head, comprising:
   a motor for lifting at least one head including:
      a stepping motor;
      a shaft extending from the stepping motor in a direction of a first axis, the shaft being coupled to the stepping motor for rotation about the first axis, the stepping motor providing controlled rotational movement of the shaft; and
      a guide pin extending from the stepping motor in approximately the direction of the first axis and spaced apart from the shaft; and
   a bracket including at least:
      a mating surface configured for coupling to at least one head;
      a first opening encircling the shaft;
      a second opening encircling the guide pin;
      a bushing disposed in the second opening, the bushing being coupled with the guide pin to limit movement of at least one head radially and circumferentially relative to the shaft and having an oval inner diameter that forms a slot having two sides for contacting the guide pin; and
      a shaft-linking element positioned and dimensioned for coupling with the shaft.

2. The head lifting system of claim 1, wherein the oval inner diameter is dimensioned to provide a clearance between the guide pin and the oval inner diameter in a range from approximately 0.0005 inch to approximately 0.005 inch.

3. The head lifting system of claim 1, wherein the bushing is spring loaded and has more than one side, the spring loading causing the bushing to ride along the guide pin on only one of the sides.

4. The head lifting system of claim 1, wherein a clearance between the guide pin and the bushing is in a range from approximately 0.0003 inch to approximately 0.006 inch.

5. The head lifting system of claim 1, wherein:
   the shaft-linking element comprises a nut coupled with the first opening, the nut configured to threadably engage with the shaft for converting rotational movement of the shaft to movement of the at least one head approximately in the direction of the first axis;
   the bracket further comprises at least one shaft bushing, one of the shaft bushings being disposed in the first opening; and
   the shaft comprises a lead-screw.

6. The head lifting system of claim 5, wherein the lead-screw has a maximum tilt relative to the guide pin of approximately 0.010 inch.

7. The head lifting system of claim 5, including:
   an elastic member encircling the nut; and
   wherein:
      the nut includes:
         a passageway having threads for coupling with the lead-screw, the threads being disposed on threaded segments of the nut, the lead-screw extending through the passageway of the nut and being in threaded engagement therewith so that rotation of the lead-screw moves the headlift bracket in the direction of the first axis; and
         a slot extending axially through the threaded passageway and in communication therewith, the slot having two ends; and
      the elastic member presses inwardly on the slot between the two ends of the slot to elastically deform the nut to uniformly urge the passageway threads of the nut against the threads of the lead-screw inducing approximately no reactionary forces at the first opening.

8. The head lifting system of claim 7, including:
an elastic compression member disposed in an annular groove formed on the periphery of the threaded segments, the elastic compression member urging the threaded segments against the lead-screw;
a shock suppression sleeve including:
  a hollow cylindrical cavity for receiving the lead-screw therethrough; and
  a cup with a generally conical hollow interior cavity dimensioned to fit over the threaded segments of the nut;
a pair of generally conical ramps formed on interior walls of the cup, the ramps exerting a substantially uniform axial force on the elastic compression member; and
an axial bias force means for forcing the cup to contact the threaded segments.

9. The head lifting system of claim 1, wherein:
the motor includes a casing enclosing the stepping motor, the casing including a faceplate having:
  a bore aligned and dimensioned for receiving the guide pin; and
  an approximately planar surface oriented approximately perpendicular to the first axis; and
the guide pin is press fit into the first bore and is disposed outwardly from the faceplate.

10. The head lifting system of claim 9 including an assembly frame having at least one frame attachment feature, wherein:
the faceplate includes at least one faceplate attachment element, each faceplate attachment element being positioned and dimensioned for attaching the stepping motor to a corresponding frame attachment feature; and
at least one of the faceplate attachment elements has a top surface for coupling with a corresponding frame attachment feature, the top surface of at least one faceplate attachment element being approximately perpendicular to the direction of the first axis.

11. The head lifting system of claim 10, wherein:
the guide pin has a length; and
a direction corresponding to the length of the guide pin is perpendicular to the top surface of the flange to within approximately 0.01 inch.

12. The head lifting system of claim 10, wherein a clearance provided between the bracket and the assembly frame is in a range from approximately 0.02 in to approximately 0.10 inch before an azimuth and zenith adjustment.

13. A system for lifting at least one head, comprising:
means for lifting at least one head including:
  a rotating motor means;
  a means for translating rotational movement into lateral movement extending from the rotating motor means in a direction of a first axis, the means for translating rotational movement coupled to the rotating motor means for rotation about the first axis, the rotating motor means providing controlled rotational movement of the means for translating rotational movement; and
  a guiding means extending from the rotating motor means, in approximately the direction of the first axis and spaced apart from the means for translating rotational movement; and
a means for coupling the means for translating rotational movement with at least one head including at least:
  a means for attaching to at least one head;
  a first opening encircling the means for translating rotational movement;
  a second opening encircling the guiding means;
  a first bushing disposed in the second opening, the bushing being coupled with the guiding means to limit movement of at least one head radially and circumferentially relative to the means for translating rotational movement and having an oval inner diameter that forms a slot having two sides for contacting the guiding means; and
  a shaft-linking means positioned and dimensioned for threadably engaging the means for translating rotational movement.

14. The head lifting system of claim 13, wherein:
the shaft-linking means comprises a nut coupled with the first opening, the nut configured to threadably engage with the means for translating rotational movement to convert rotational movement of the means for translating rotational movement into movement of at least one head in the direction of the first axis;
the means for coupling the means for translating rotational movement with at least one head further comprising at least a second bushing, one of the second bushings being disposed in the first opening; and
the means for translating rotational movement comprises a lead-screw.

15. A system for lifting at least one head, comprising:
a motor for lifting at least one head including:
  a stepping motor;
  a shaft coupled to the stepping motor for rotation about a first axis; and
  a guide pin extending from the stepping motor in approximately the direction of the first axis and spaced apart from the shaft; and
a bracket including at least:
  a first opening encircling the shaft;
  a second opening encircling the guide pin;
  a bushing disposed in the second opening, the bushing being coupled with the guide pin to limit movement of at least one head radially and circumferentially relative to the shaft and having an oval inner diameter that forms a slot having two sides for contacting the guide pin; and
  a shaft-linking element positioned and dimensioned for coupling with the shaft.

16. The head lifting system of claim 15, wherein:
the shaft-linking element comprises a nut coupled with the first opening, the nut configured to threadably engage with the shaft;
the bracket further comprises at least one shaft bushing, one of the shaft bushings being disposed in the first opening; and
the shaft comprises a lead-screw.

17. The head lifting system of claim 1, wherein said bracket further comprises an arm extending from the mating surface, the first opening and the second opening being provided said arm.

18. The head lifting system of claim 13, wherein the means for coupling further comprises a means for placing the means for translating rotational movement and the guiding means, the first opening and the second opening being provided on the means for placing.

19. The head lifting system of claim 15, wherein the bracket further includes an arm, the first opening and the second opening being provided on said arm.

* * * * *